United States Patent
Chattopadhyay et al.

(10) Patent No.: US 6,235,104 B1
(45) Date of Patent: May 22, 2001

(54) PRODUCTION OF PIGMENTS

(75) Inventors: Arun Kumar Chattopadhyay, Quebec (CA); Thomas Aquinas Barry, Tramore (IE)

(73) Assignee: Dahlia Ireland Limited, Waterford (IE)

( * ) Notice: Subject to any disclaimer, the term of this patent is extended or adjusted under 35 U.S.C. 154(b) by 0 days.

(21) Appl. No.: 09/249,078

(22) Filed: Feb. 12, 1999

(30) Foreign Application Priority Data

Feb. 13, 1998 (IR) .......................................... 980105

(51) Int. Cl.⁷ ............................... C09C 1/62; C09C 1/64; C09C 3/08
(52) U.S. Cl. .................. 106/403; 106/404; 106/504; 524/440; 524/441
(58) Field of Search ..................... 106/403, 404, 106/504; 524/440, 441

(56) References Cited

U.S. PATENT DOCUMENTS

| 5,122,188 | * 6/1992 | Erhan et al. ................. 106/31.66 |
| 5,221,340 | 6/1993 | Nagase et al. ................ 106/403 |
| 5,556,454 | 9/1996 | Bender ......................... 106/218 |

FOREIGN PATENT DOCUMENTS

| 0232219 | 8/1987 | (EP) . |
| 0402998 | 12/1990 | (EP) . |
| 0455370 | 11/1991 | (EP) . |
| WO90/03419 | 4/1990 | (WO) . |
| WO95/14520 | 6/1995 | (WO) . |

OTHER PUBLICATIONS

Patent Abstract for JP–60035064 A (Feb. 1985).

* cited by examiner

*Primary Examiner*—Anthony Green
(74) *Attorney, Agent, or Firm*—Jacobson, Price, Holman & Stern, PLLC

(57) ABSTRACT

Metal pigment, especially aluminum pigment is produced in a non toxic environment by milling and/or blending in an inert medium comprising transesterified alkyl, especially methyl esters of vegetable oils selected from soybean oil, cotton seed oil and linseed oil. The metallic pigments produced are of improved quality and appearance. They have improved brightness and the non-leafing pigments produced have highly leafing characteristics.

15 Claims, No Drawings

PRODUCTION OF PIGMENTS

The invention relates to milling and dispersion medium for producing metallic pigments.

INTRODUCTION

Aluminium pigments are widely used in coating compositions particularly in paint industries to impart a metallic lustre. There are two different types of aluminium flake pigments known as leafing and nonleafing flake pigments. In leafing pigments, the aluminium flakes become arranged in a generally flat orientation at the surface of the coating to produce a mirror-like metallic finish. In the case of nonleafing aluminium flakes, the flakes are generally randomly oriented in the coating composition.

Regardless of their nature, aluminium pigments are conventionally manufactured by milling granular or spherical aluminium particles or shredded forms of aluminium foils in the presence of a desired fatty acid in a mineral spirit medium containing aliphatic and aromatic hydrocarbons. The fatty acids are hereinafter referred as lubricant. A small quantity of a suitable lubricant and a milling or grinding medium consisting of a carrier liquid, which is conventionally known as mineral spirit, is added to the aluminium particles during milling. The slurry thus formed is filtered to remove unwanted coarse particles. The paste is generally re-blended with mineral spirit to obtain a desired concentration of the aluminium metal pigment in the paste.

By the choice of milling lubricants either a 'leafing' type or 'nonleafing' pigment may be produced.

In all conventional methods of manufacture, the carrier liquids used contain volatile organic material, having small to medium range aliphatic and complex aromatic molecules. These are undesirable environmentally as a portion of these can be released to atmosphere which cause the initiation of the formation of various toxic radicals through complex photochemical processes.

The release of volatile organic material into the atmosphere from processes for producing metallic pigments is a serious problem and this invention addresses this problem.

STATEMENTS OF INVENTION

According to one aspect the invention provides the use of trans-esterified alkyl esters of vegetable oils in the manufacture and/or formulation of metallic pigment compositions.

In another aspect the invention provides a metallic pigment composition comprising a metallic pigment and an inert medium including trans-esterified alkyl esters of vegetable oils.

In a further aspect the invention provides a method of manufacturing a metallic pigment composition comprising the step of contacting metallic particles with an inert medium comprising trans-esterified alkyl esters of vegetable oils.

In one case the metallic particles are contacted with the inert medium by milling the metal in the presence of the inert medium.

Alternatively or additionally the metallic particles are contacted by blending the metallic particles with the inert medium to form a metallic paste.

The metallic particles may also be contacted by blending a metallic paste with the inert medium.

The invention also provides a coating composition in the form of a paint or ink including a metallic pigment composition of the invention.

The invention further provides a plastics composition, especially a metallised plastics composition including a metallic pigment composition of the invention.

In a preferred embodiment of the various aspects of the invention the alkyl contains from 1 to 4 carbon atoms. Most preferably the trans-esterified alkyl esters are methyl esters.

In a preferred embodiment the vegetable oil has a high content of saturated or unsaturated fatty acids. Typically the vegetable oil is selected from one or more of soybean oil, cottonseed oil, linseed oil, rapeseed oil and sunflower oil.

DETAILED DESCRIPTION

The purpose of milling and/or blending metal pigment in trans-esterified alkyl, especially methyl esters or vegetable oils, viz. soy bean oil, cotton seed oil, linseed oil, and the like, is to produce metal pigments in a non-toxic environment. Surprisingly, we have also found the added advantage that the metallic pigments produced are of improved quality and appearance. The pigments so produced showed the general tendency of improved brightness with a unique non-leafing type of pigments of highly leafing characteristics. This arises because the use of the inert medium changes the wetting properties of the metal flakes and the substrate so as to favour the orientation of the flake particles despite being a non-leafing type of material as determined by any conventional method of measurement method.

The trans-esterified alkyl, especially methyl esters derived from vegetable oils comprise mono, di, and/or tri-glycerides of fatty acids of a mixture of both saturated and unsaturated hydrocarbons. The chain length generally ranges between $C_8$–$C_{22}$, and they are mostly rich in mono and or unsaturated hydrocarbons. The inert medium used in the invention is commercially available and known as Biodiesel or Envirodiesel (Twin Rivers Technologies & Ag Products, USA).

These materials are biodegradable and of low viscosity, low volatility and of high flash point which make them safer to use as a replacement for the conventional milling medium.

The invention also provides the manufacture of aluminium pastes in which the inert medium is used for blending pastes by replacing mineral spirits to obtain products suitable for inks and plastics industries. Pigments produced according to the present invention are much more brilliant and metallic in lustre and exhibit superior colour purity. Polychromatic pain films prepared according to conventional formulations, when pigmented with aluminium paste produced according to this invention, when compared to similar films pigmented with aluminium pigment produced by conventional processes, were superior in gloss, brilliance, colour purity and exhibited higher reflectance as compared by qualitative visual means.

In a method of manufacturing a metallic pigment of the invention aluminium granules or coarse spheres are subjected to a wet comminution operation in a grinding circuit in which the metallic particles are maintained within the inert medium. The liquid bearing the comminuted particles is generally withdrawn from the comminuting operation and sieved to remove the oversize particles. The fraction containing coarser particles is returned to the grinding circuit. The fraction containing particles of desired size is removed from the circuit and subjected to filtration and blending to obtain an aluminium paste of desired metal concentration, which is normally 65 wt % of the total mass.

EXAMPLE 1

A ball mill of dimensions 3 feet (91.44 cm) diameter and 1 foot (30.48 cm) long was charged with 750 lbs (341 kgs)

of steel balls of mixed size from ¼ inch (6.35 mm) diameter to ½ inch (12.7 mm) diameter. 15.5 lbs (7 kgs) of aluminium granules made from cut foils of bulk density 0.42 g/cc, 0.8 lbs (0.36 kgs) of high purity stearic acid as a lubricant and 17.33 lbs (8 kg) of Biodiesel were added to the mill. The milling operation was continued for 4 hrs at a speed of 40 rpm. Under an equilibrium operating condition a slurry of Biodiesel and flake aluminium particles containing approximately 23% solid was pumped at the rate of 172 lbs/hr (80 kgs/hr) to a multideck vibratory screening device fitted with screens of graduated fineness from 80 mesh on the top deck to 230 mesh. The product was the minus 230 mesh portion and was produced at the rate of 6 lbs/hr (2.7 kgs/hr) of metal solids. All of the oversize was returned to the mill together with 2 lbs (0.91 kgs) of aluminium granules to maintain the circulating metal content of the system constant. Quantities of Biodiesel and lubricant were added in a sufficient amount to maintain a material balance in the system.

The product was largely freed from the Biodiesel diluent by means of a filter press. The Biodiesel so separated was used to make up the Biodiesel requirement to blend the filtered metal particles in a paste of 65% solids of average particle size 17 micron.

The paste thus prepared was examined in paint films and compared visually with the paint films prepared from aluminium pigments of similar particle size manufactured using a conventional mineral spirit medium.

The conventional methods of measuring leafing properties showed no leafing value for the Biodiesel based aluminium pigments. Despite their highly non-leafing characteristics, the products of the present invention provided surfaces with as high a brilliance as that of the leafing grade conventional pastes.

EXAMPLE 2

In a ball mill of dimensions 1 foot (30.48 cm) long and 6 inch (15.24 cm) diameter 56 kg of steel balls of diameters of 12.7 mm, 9.3 mm and 6.4 mm were charged at a ratio of 1:1:5 respectively. 2 kg of aluminium granules of bulk density 0.38 g/cc, 2 kg of Biodiesel and 80 gms of stearic acid were added to the mill and run for 7 hrs at a speed of 54 rpm. Upon completion of the milling operation, the milled metal pigment was diluted in the form of a slurry with 11.8 liters of Biodiesel and sieved through a screen of 230 mesh. The product of minus 230 mesh thus formed was filtered through a filter press. The filtered materials containing 84% solid was reblended with Biodiesel to form a paste containing 65% solid of average particle size 18 micron.

The pigment thus formed showed similar properties to that of example 1.

EXAMPLE 3

Comparison

In an identical operating conditions as those of example 1 and 2 aluminium pastes were prepared replacing Biodiesel by mineral spirit and the process and pigment properties were compared. It was noticed that for a given filtration time, mineral spirit based pigments produced residue of lesser solids than that of the Biodiesel. This indicated an efficient filtration for the Biodiesel based materials. The mineral spirit based processes showed a tendency to form a larger percentage of finer particles compared to Biodiesel resulting in a relatively less brighter finishes.

EXAMPLE 4

400 lbs (181.8 kgs) of an aluminium paste of grade LA 1426 of Canbro Inc. containing 35% mineral spirit as a paste medium was blended with 160 lbs (72.72 kgs) of Biodiesel and subjected to vacuum drying with continuous stirring at 70° C. for 6 hrs to remove mineral spirit from the mixture. Upon completion of the vacuum drying the resulting mixture contained a paste comprising metal pigments of 65% solids and 35% Biodiesel.

A similar process was also followed by using paraffin oil instead of Biodiesel to produce a standard product 4035M3 of US Aluminium used for metallic inks of low VOC's.

The paint films of 4035M3 and that of Biodiesel were compared. Regardless of the ink vehicle system the Biodiesel based material provided superior brightness compared to 4035M3.

EXAMPLE 5

The residual Biodiesel recovered from the processes as mentioned in examples 1 and 2 was further used for milling without undergoing any additional steps of purification and distillation as conventionally followed for mineral spirit based processes. The milling and pigment manufacturing processes as described in example 1 and 2 using Biodiesel of the said process residue, exhibited no difference in material property of the pigments thus formed by the examples 1, 2 and 5.

EXAMPLE 6

3.2 kg of non-leafing grades of dry aluminium flake powders, viz. 806NL of US Aluminium was blended with a mixture of 780 gms of Biodiesel and 20 gms of octadecanitrile in a vertical blender for 40 minutes. The resulting blend containing 80% solids was blended and extruded in combination with dry plastic resins of type of polyesters, polyacrylates and polyamides to prepare a master batch of metallized plastics. In contrast with other conventional pigments, this novel blend provided ease of pigment dispersion and minimized surface defects.

EXAMPLE 7

400 lbs (1881.8 kgs) of aluminium fitercake produced by conventional means of aluminium flake manufacture of the type 806 nl as referred to in example 6, was blended with 154 lbs (70 kgs) of Biodiesel. The conventional filtercake form of 806 NL used for this experiment contained 70 WT % of aluminium flake and 30 WT % of mineral spirit.

The blended product was subjected to rotary vacuum drier at 70° C. for 5 hrs to remove mineral spirit from the mixture. Upon completion of the vacuum drying the resulting mixture contained a Biodiesel paste comprising 80% solid metal pigments. This product exhibited similar performance as that of example 6. The same method can be applied to manufacture other grades of aluminium pigment products of both leafing and non-leafing categories.

The practice of this invention leads to a tremendous flexibility with regard to its handling and usage. The inert medium used is non-toxic, biodegradable, biocompatible, of low viscosity and of low volatility. In addition, and surprisingly the use of the inert medium as a milling aid or as a medium to manufacture pigment paste provides a unique advantage of brighter metallic appearances in paint or ink formulations. The inert medium has shown its versatility also for use as a dope for metallized plastics applications.

The inert medium provides higher recyclability in the process without altering any of the characteristics material property.

The inert medium may also be used for solvent exchange to convert high VOC pastes to an ultra low VOC pastes of improved brightness.

In addition, the inert medium may be used for blending dry metal flakes to form pastes of desired solid concentration.

Further, the blends or pastes formed by the method of the invention may be used as dopes in plastics and provides improved dispersibility and material property.

It will be appreciated that while the invention has been specifically described with reference to aluminium pigments it is expected that the invention may also be applied to any other suitable metallic pigments including gold/bronze, zinc, stainless steel and the like.

It will also be appreciated that the inert medium may be used singularly or in combination with other conventional solvents used in metal pigment formulations.

The invention is not limited to the embodiments hereinbefore described which may be varied in detail.

What is claimed is:

1. A coating composition comprising a metallic pigment forming 65 wt % of the total mass and selected from the group consisting of aluminum, gold/bronze, zinc and stainless steel and an inert medium of trans-esterified alkyl esters of vegetable oils selected from the group consisting of soybean oil, cotton seed oil, rapeseed oil, sunflower oil and linseed oil.

2. The coating composition as claimed in claim 1 wherein the alkyl contains from 1 to 4 carbon atoms.

3. The coating composition as claimed in claim 1 wherein the trans-esterified alkyl esters are methyl esters.

4. The coating composition as claimed in claim 1 wherein the vegetable oil has saturated or unsaturated fatty acids.

5. A method for manufacturing a metallic pigment coating composition comprising the step of contacting metallic particles forming 65 wt % of the total mass and selected from the group consisting of aluminum, gold/bronze, zinc and stainless steel with an inert medium of trans-esterified alkyl esters of vegetable oils selected from the group consisting of soybean oil, cotton seed oil, rapeseed oil, sunflower oil and linseed oil.

6. The method as claimed in claim 5 wherein the metallic particles are contacted with the inert medium by milling of metals in the presence of the inert medium.

7. The method as claimed in claim 5 wherein the metallic particles are contacted by blending the metallic particles with the inert medium to form a metallic paste.

8. A method as claimed in claim 5 wherein the metallic particles are contacted by blending a metallic paste with the inert medium.

9. The method as claimed in claim 5 wherein the alkyl contains from 1 to 4 carbon atoms.

10. The method as claimed in claim 5 wherein the trans-esterified alkyl esters are methyl esters.

11. The method as claimed in claim 5 wherein the vegetable oil has saturated or unsaturated fatty acids.

12. The coating composition as claimed in claim 1 in the form of a paint.

13. The coating composition as claimed in claim 1 in the form of an ink.

14. A doping system comprising a metallic pigment forming 65 wt % of the total mass and selected from the group consisting of aluminum, gold/bronze, zinc and stainless steel and an inert medium of trans-esterified alkyl esters of vegetable oils selected from the group consisting of soybean oil, cotton seed oil, rapeseed oil, sunflower oil and linseed oil.

15. A metallised plastics composition comprising a metallic pigment forming 65 wt % of the total mass and selected from the group consisting of aluminum, gold/bronze, zinc and stainless steel and an inert medium of trans-esterified alkyl esters of vegetable oils selected from the group consisting of soybean oil, cotton seed oil, rapeseed oil, sunflower oil and linseed oil.

* * * * *